(12) United States Patent
Lemay

(10) Patent No.: US 10,330,235 B2
(45) Date of Patent: Jun. 25, 2019

(54) DEVICE FOR PREVENTING ACCESS TO A CONDUIT

(71) Applicant: Pierre Lemay, Quebec (CA)

(72) Inventor: Pierre Lemay, Quebec (CA)

( * ) Notice: Subject to any disclaimer, the term of this patent is extended or adjusted under 35 U.S.C. 154(b) by 70 days.

(21) Appl. No.: 15/630,156

(22) Filed: Jun. 22, 2017

(65) Prior Publication Data

US 2018/0372259 A1  Dec. 27, 2018

(51) Int. Cl.
| | |
|---|---|
| *F16L 55/10* | (2006.01) |
| *F16L 55/13* | (2006.01) |
| *F16L 55/132* | (2006.01) |
| *E03B 7/10* | (2006.01) |

(52) U.S. Cl.
CPC .............. *F16L 55/13* (2013.01); *F16L 55/132* (2013.01); *E03B 7/10* (2013.01)

(58) Field of Classification Search
CPC ....... F16L 55/13; F16L 55/132; F16L 55/1141
USPC .......................................... 138/89, 90, 96 R
See application file for complete search history.

(56) References Cited

U.S. PATENT DOCUMENTS

| | | | | |
|---|---|---|---|---|
| 987,812 | A * | 3/1911 | Moor | E21B 33/134 138/89 |
| 1,573,031 | A * | 2/1926 | Bettis | E21B 17/1042 138/96 R |
| 1,997,878 | A * | 4/1935 | Wagner | F16L 55/132 138/89 |
| 2,479,862 | A * | 8/1949 | Payne | F16L 55/132 215/359 |
| 2,512,041 | A * | 6/1950 | Steele | F16L 55/1286 138/89 |
| 3,998,245 | A * | 12/1976 | Martin | E03B 5/06 138/89 |
| 4,381,800 | A * | 5/1983 | Leslie | G01N 3/12 138/90 |
| 4,529,007 | A * | 7/1985 | Goforth | F16L 55/132 138/89 |
| 4,759,462 | A * | 7/1988 | Neglio | B65D 39/12 220/235 |
| 5,363,881 | A * | 11/1994 | Larkin | F16L 55/132 138/89 |

(Continued)

OTHER PUBLICATIONS

Ville De Québec—Division Du Traitement Des Eaux—Lauréat régional 2015—Capitale-Nationale; Oct. 29, 2015; retrieved from https://www.youtube.com/watch?v=N_i_4Zj_obg&sns=e on Sep. 22, 2017.

*Primary Examiner* — James F Hook
(74) *Attorney, Agent, or Firm* — BCF LLP

(57) ABSTRACT

The present disclosure relates to a device for preventing access to a conduit. The device comprises top and bottom compression plates and a compressible member between the compression plates. A bolt has a first end mounted to the bottom compression plate and a shaft passing through openings of the compressible member and of the top compression plate. The bolt has a head proximate its second end. The head of the bolt extends beyond a major diameter of the threaded shaft. At least a portion of the shaft is a threaded shaft. The head of the bolt prevents a nut mounted on the threaded shaft between the head and the top compression plate from being dismounted from the device. A fluid passage may extend in the compressible member between the top and bottom compression plates to allow a fluid to bypass the device.

20 Claims, 12 Drawing Sheets

(56) References Cited

U.S. PATENT DOCUMENTS

| | | | | |
|---|---|---|---|---|
| 6,257,266 B1 * | 7/2001 | Valdez | ................ | F16L 55/132 |
| | | | | 137/15.08 |
| 7,152,631 B1 * | 12/2006 | Fails | ................ | F16L 55/1608 |
| | | | | 138/97 |
| 2006/0042708 A1 * | 3/2006 | Stowe | ................ | F16L 35/00 |
| | | | | 138/89 |
| 2007/0006928 A1 * | 1/2007 | Meserlian | ................ | E04H 4/12 |
| | | | | 138/89 |

\* cited by examiner

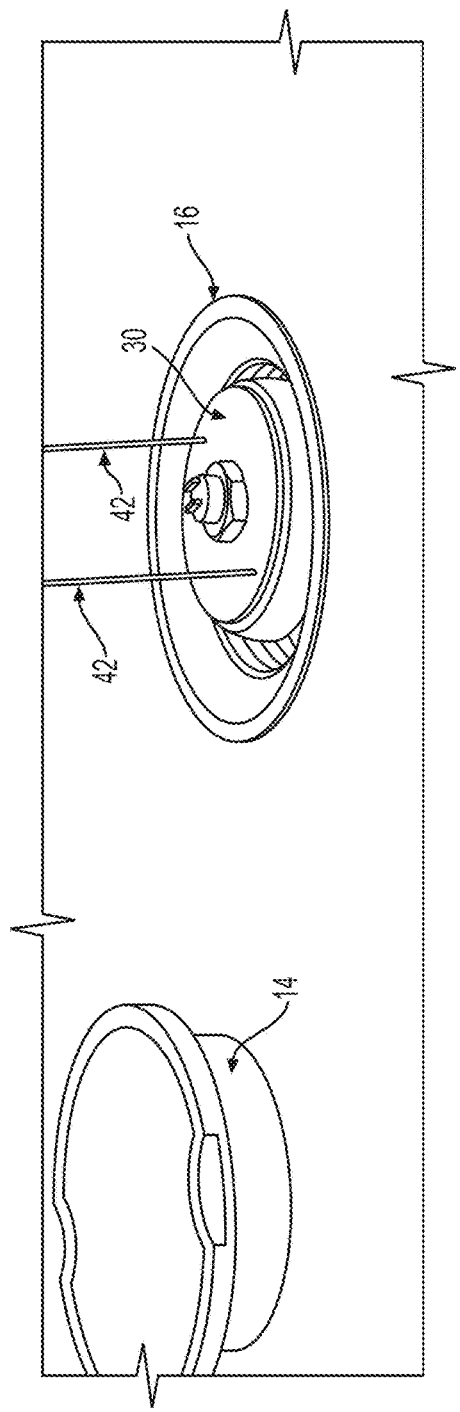
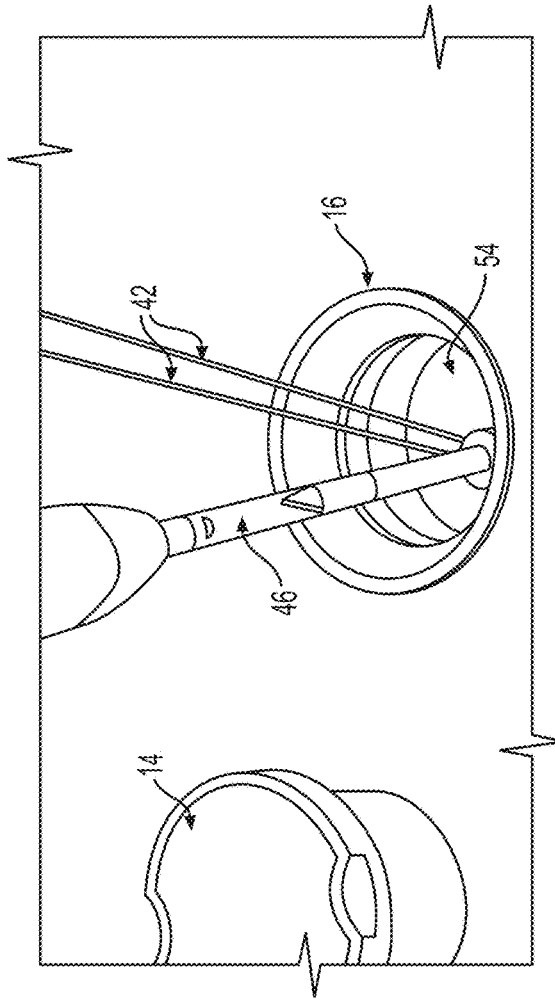

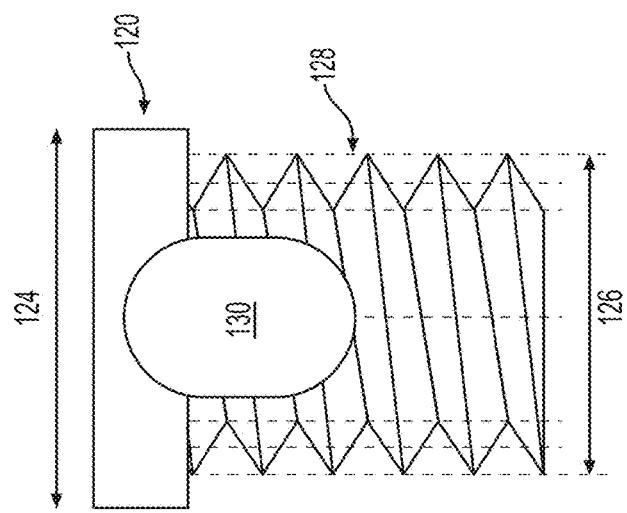
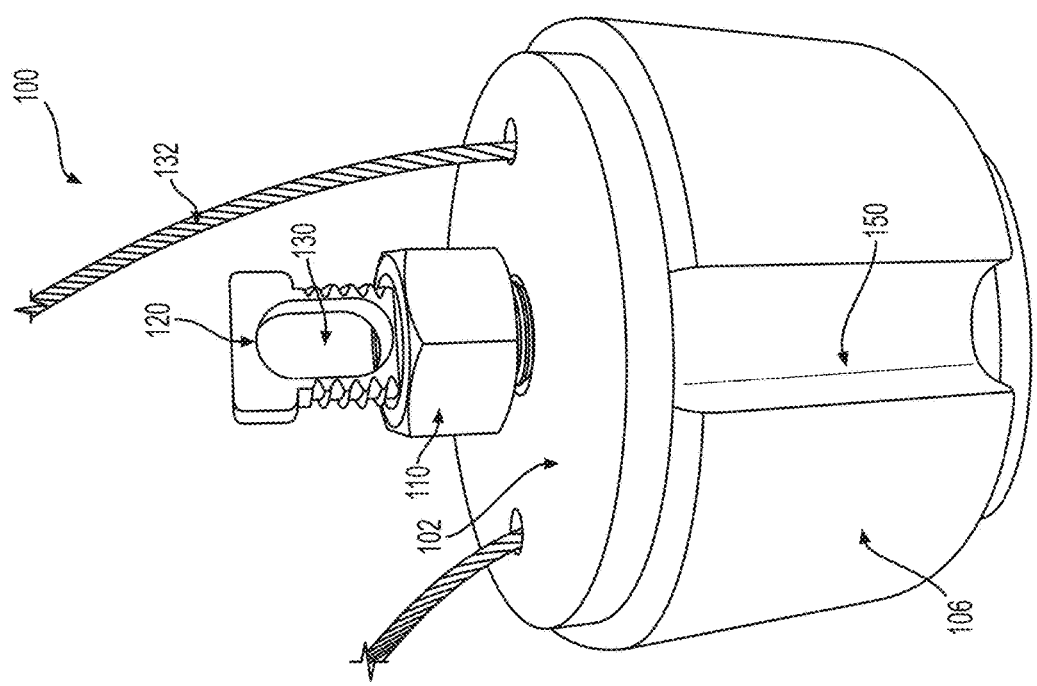

US 10,330,235 B2

DEVICE FOR PREVENTING ACCESS TO A CONDUIT

TECHNICAL FIELD

The present disclosure relates to the field of safety devices. More specifically, the present disclosure relates to a device that can be installed in a conduit for preventing access thereto.

BACKGROUND

A medium size city such as Quebec City, QC, Canada has four (4) water treatment plants connected to 2300 km of drinking water conduits and two (2) waste water treatment plants connected to 3000 km of sewer conduits to serve a population of about half a million people. Water systems of larger cities are comparatively larger and form very complex networks.

Maintenance operations are frequently required in these water systems. Such operations oftentimes require the closing of underground water valves to prevent flooding of conduits, allowing access by maintenance personnel. Accidental or malicious operation of an underground water valve while a worker is present in a conduit can have dramatic implications: a conduit deep underground may be filled in just a few seconds by opening a 12-inch water main. In a large city having hundreds of underground water valves spread over a large network of streets and underground conduits, such accidents are possible and must be prevented.

FIG. 1 (Prior Art) shows a worker manipulating an underground valve before accessing a manhole. On a street 10, a worker 12 has removed a cap 14 to get access to a vertical conduit 16 at the bottom of which a underground water valve (not shown) controls the flow of water in an underground conduit (not shown). The worker 12 uses an elongated tool 18 to close the underground water valve. The underground water valve may be quite deep underneath the surface of the street 10, generally at least below the frost line, for example at a depth between 12 and 15 feet. Before accessing the underground conduit via a manhole 20, the worker 12 would traditionally replace the cap 14 to close the vertical conduit 16, preventing access to the underground water valve. The worker 12 would use spray paint from a can 22 to mark the cap 14, indicating to other workers (not shown) that the underground water valve is closed and should remain closed for safety reasons.

Conventionally, no technical means other than a mere visual indication was available to prevent accidental or malicious operation of the underground water valve. Opening the underground water valve when the worker 12 was present in the underground conduit could have fatal consequence.

A conduit blocking device has been implemented and tested and provides some improvements to worker safety. FIG. 2a (Prior Art) is a perspective view of a conventional conduit blocking device. FIG. 2b (Prior Art) shows the effect of applying compression on the conventional conduit blocking device of FIG. 2a. FIG. 3a (Prior Art) shows a first installation phase of the conventional conduit blocking device of FIG. 2a. FIG. 3b (Prior Art) shows a second installation phase of the conventional conduit blocking device of FIG. 2a. FIG. 4 (Prior Art) shows a padlock mounted to the conventional conduit blocking device of FIG. 2a. Referring at once to FIGS. 2a, 2b, 3a, 3b and 4, a conduit blocking device 30 comprises a top plate 32 and a bottom plate (not shown) adapted to compress a donut-shaped polymer ring 34. A bolt 36 is fixedly mounted to the bottom plate and passes through an opening (not shown) at the center of the top plate 32. A nut 38 is mounted to the bolt 36 and is rotated to apply or release pressure on top plate 32 and on the ring 34. The bolt 36 has an aperture 40 at its top. A wire 42 is attached to the bottom plate and passes through openings 44 of the top plate 32, through openings (not shown) within the ring 34 and reaches the bottom plate. The wire 42 forms a loop at its top (not shown). As shown specifically on FIG. 2b, using a tool 46 to rotate the nut 38 causes a pressure to be applied between the top plate 38 and the bottom plate, whereby a height 48 of the ring 34 is reduced while a width 50 of the ring 34 expands.

Referring specifically to FIGS. 3a and 3b, in operation, after having closed the underground water valve, the worker 12 holds the conduit blocking device 30 by its wire 42 and lowers the conduit blocking device 30 partway within the vertical conduit 16 (FIG. 3a). The worker 12 uses the tool 46 to rotate the nut 38 (FIG. 3b), causing the ring 34 to compress. The width 50 of the ring 34 expands until it mates with the interior surface 54 of the vertical conduit 16. Under this condition, the conduit blocking device 30 is locked in position within the vertical conduit 16, blocking access to the underground water valve located at the bottom of the vertical conduit 16. As shown specifically on FIG. 4, a padlock 52 is mounted to the aperture 40 on the top of the bolt 36. Accidental or malicious operation of the underground water valve is prevented.

Although the conduit blocking device 30 provides significant safety improvements over the conventional techniques, it still suffers from several inconveniences. One such inconvenience lies in the fact that at least some of the components of the conduit blocking device 30, for example the bottom plate, may fall within the vertical conduit 16, down to a level of the underground water valve. This incident may easily occur because the worker 12 cannot see the position of the nut 38 in relation to the top of the bolt 36 when rotating the nut 38 to release the pressure on the top plate 32 and on the ring 34. Because the diameter of the bottom plate is only slightly inferior to the interior diameter of the vertical conduit 16 and because of the depth at which the underground water valve is located at the bottom of the vertical conduit 16, removing the bottom plate or any other part of the conduit blocking device 30 can be quite difficult and time consuming; possibly requiring digging the street 10 down to the bottom of the vertical conduit 16.

Another inconvenience of the conduit blocking device 30 is that it may retain water that may enter the top of the vertical conduit 16. Operation of the conduit blocking device 30 in winter conditions may be quite difficult as water may freeze at a level where the padlock 52, the bolt 36 and the nut 38 are located, expansion of the water as it freezes possibly causing a failure of the upper part of the vertical conduit 16. At least because water conduit failures are fairly frequent in the winter, this situation is expected to be frequent as well.

Therefore, there is a need for improvements that compensate for operational problems of conduit blocking devices used to overcome safety concerns of workers accessing underground conduits.

SUMMARY

According to the present disclosure, there is provided a device for preventing access to a conduit. The device comprises top and bottom compression plates, a compressible member between the top and bottom compression plates, a bolt and a nut. The bolt has a first end mounted to the bottom compression plate and a shaft passing through openings of the compressible member and of the top compression plate. The bolt has a second end opposite from the first end and a head proximate to the second end. At least a portion of the shaft proximate to the second end is a threaded shaft. The head of the bolt extends beyond a major diameter of the threaded shaft. The nut is mounted on the threaded shaft between the head and the top compression plate.

The present disclosure further relates to a device for preventing access to a conduit. The device comprises top and bottom compression plates, a compressible member between the top and bottom compression plates, a bolt and a nut. The compressible member comprises a fluid passage extending between the top and bottom compression plates. The bolt has a first end mounted to the bottom compression plate and a shaft passing through openings of the compressible member and of the top compression plate. The bolt has a second end opposite from the first end. At least a portion of the shaft proximate to the second end is a threaded shaft. The nut is mounted on the threaded shaft between the head and the top compression plate. The top and bottom compression plates are sized and configured to allow passage of a fluid via the fluid passage between the top and bottom compression plates.

The foregoing and other features will become more apparent upon reading of the following non-restrictive description of illustrative embodiments thereof, given by way of non-limitative examples only with reference to the accompanying drawings.

BRIEF DESCRIPTION OF THE DRAWINGS

Embodiments of the disclosure will be described by way of example only with reference to the accompanying drawings, in which:

FIG. 2b (Prior Art) shows the effect of applying compression on the conventional conduit blocking device of FIG. 2a;

FIG. 3a (Prior Art) shows a first installation phase of the conventional conduit blocking device of FIG. 2a;

FIG. 3b (Prior Art) shows a second installation phase of the conventional conduit blocking device of FIG. 2a;

FIG. 4 (Prior Art) shows a padlock mounted to the conventional conduit blocking device of FIG. 2a;

FIG. 6a is a detailed view of the one-piece device for preventing access to a conduit of FIG. 5 showing the nut in a lowered position;

FIG. 6b is an enlarged view of a portion of FIG. 6a;

Like numerals represent like features on the various drawings.

DETAILED DESCRIPTION

Various aspects of the present disclosure generally address one or more of the operational problems of conduit blocking devices used to overcome safety concerns of workers accessing underground conduits.

In one aspect, the present disclosure introduces a device for preventing access to a conduit that is configured to prevent accidental dismounting of its various components. In at least one variant, the device can be understood as a one-piece device in the sense that it cannot be disassembled without breaking it, once fabricated. In another aspect, the present disclosure introduces a device for preventing access to a conduit that is configured to allow passage of water or similar fluid when the device is fixedly installed in the conduit. In yet another aspect, the present disclosure introduces a device for preventing access to a conduit that is configured at once to prevent accidental dismounting of its various components and to allow passage of water or similar fluid when the device is fixedly installed in the conduit. The present device for preventing access to a conduit as disclosed herein in various embodiments can be used in the same or equivalent manner as the conduit blocking device 30 introduced hereinabove.

Figure 5:
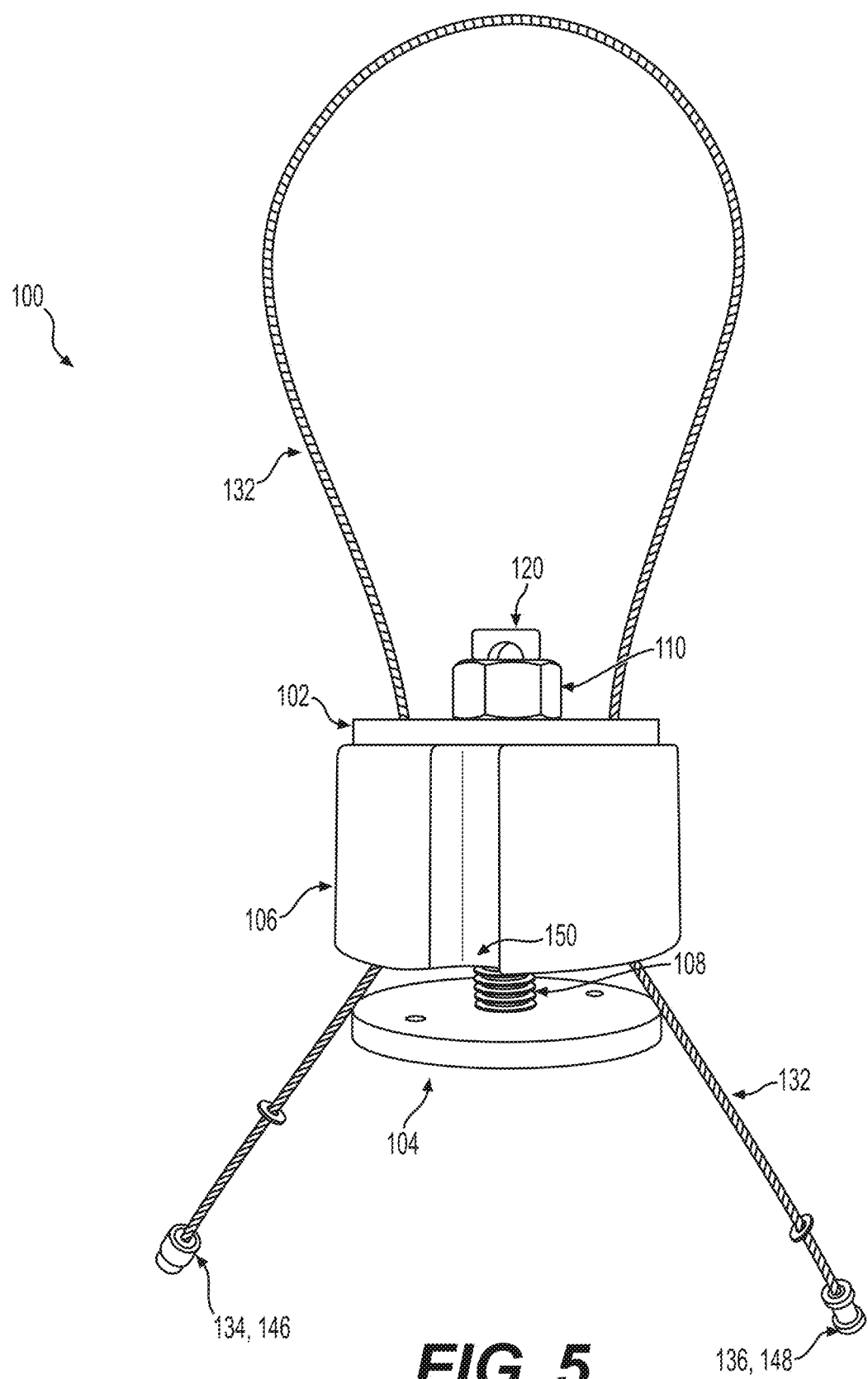
FIG. 5 is a plan elevation view of a one-piece device for preventing access to a conduit according to an embodiment.
Figure 7:
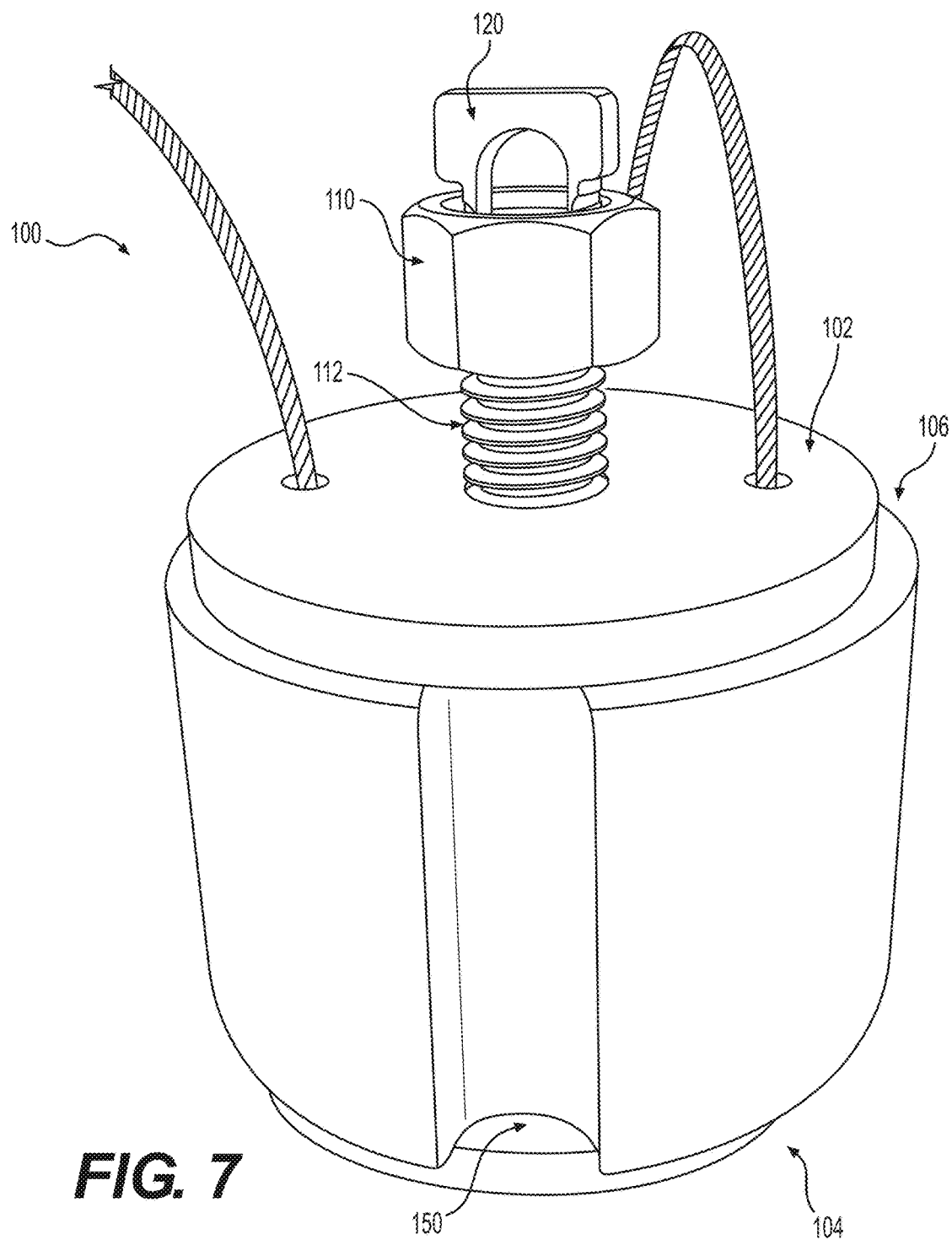
FIG. 7 is a detailed view of the one-piece device for preventing access to a conduit of FIG. 5 showing the nut in a raised position.
Figure 8:
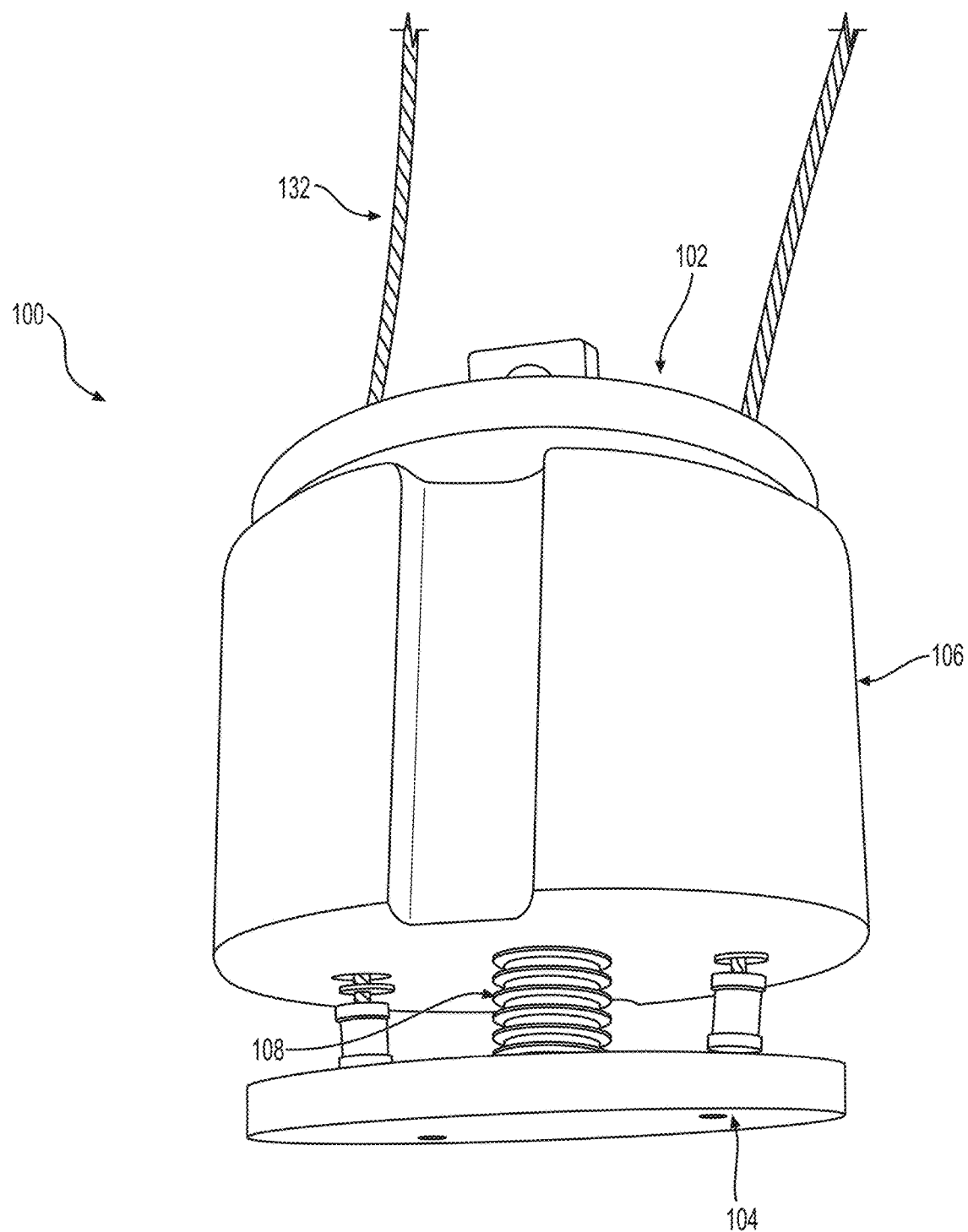
FIG. 8 is a detailed view of the one-piece device for preventing access to a conduit of FIG. 5 showing a compressible member in a raised position.
Figure 9:
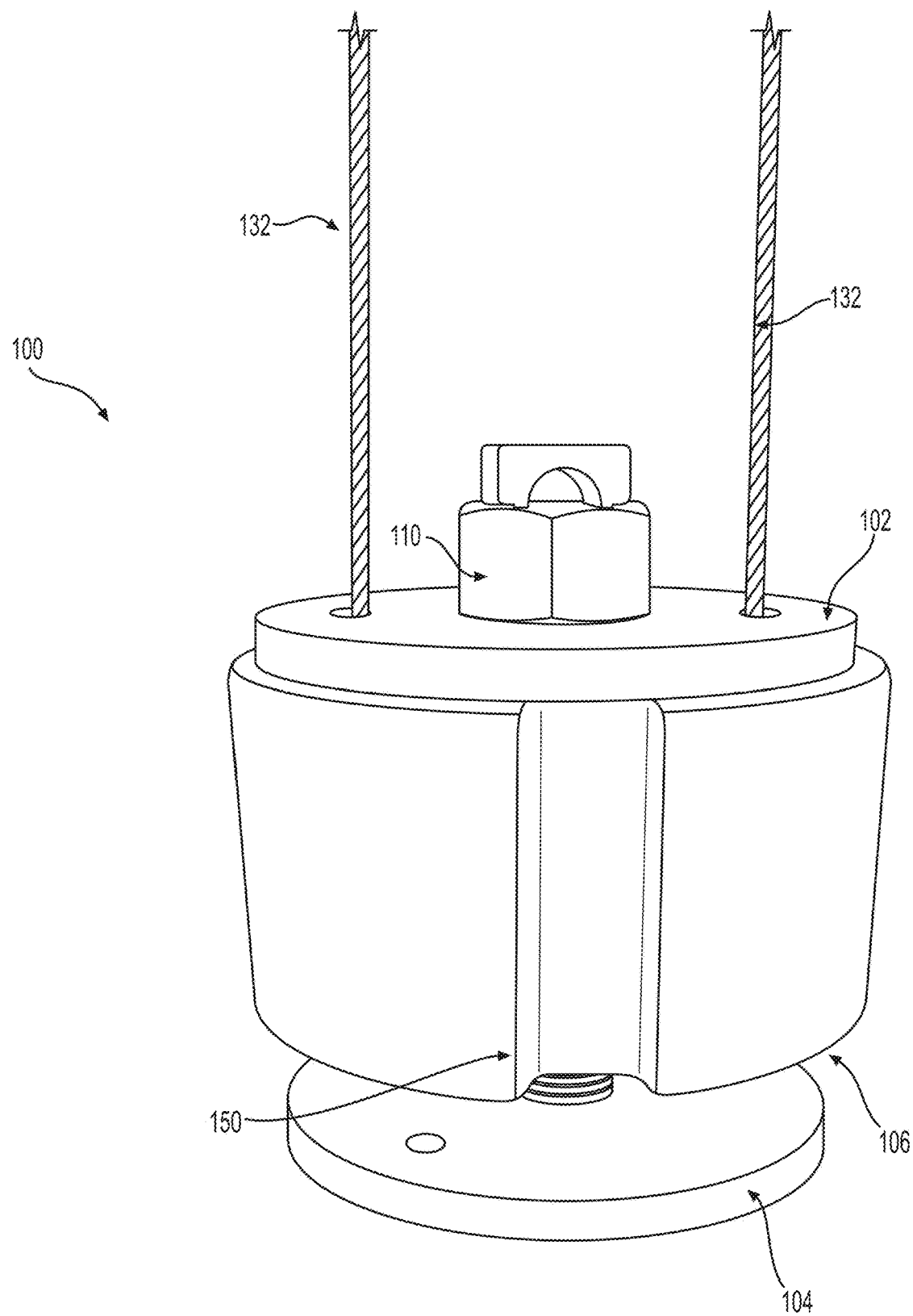
FIG. 9 is a detailed view of the one-piece device for preventing access to a conduit of FIG. 5, the device for preventing access to a conduit being held by a wire loop.
Figure 10:
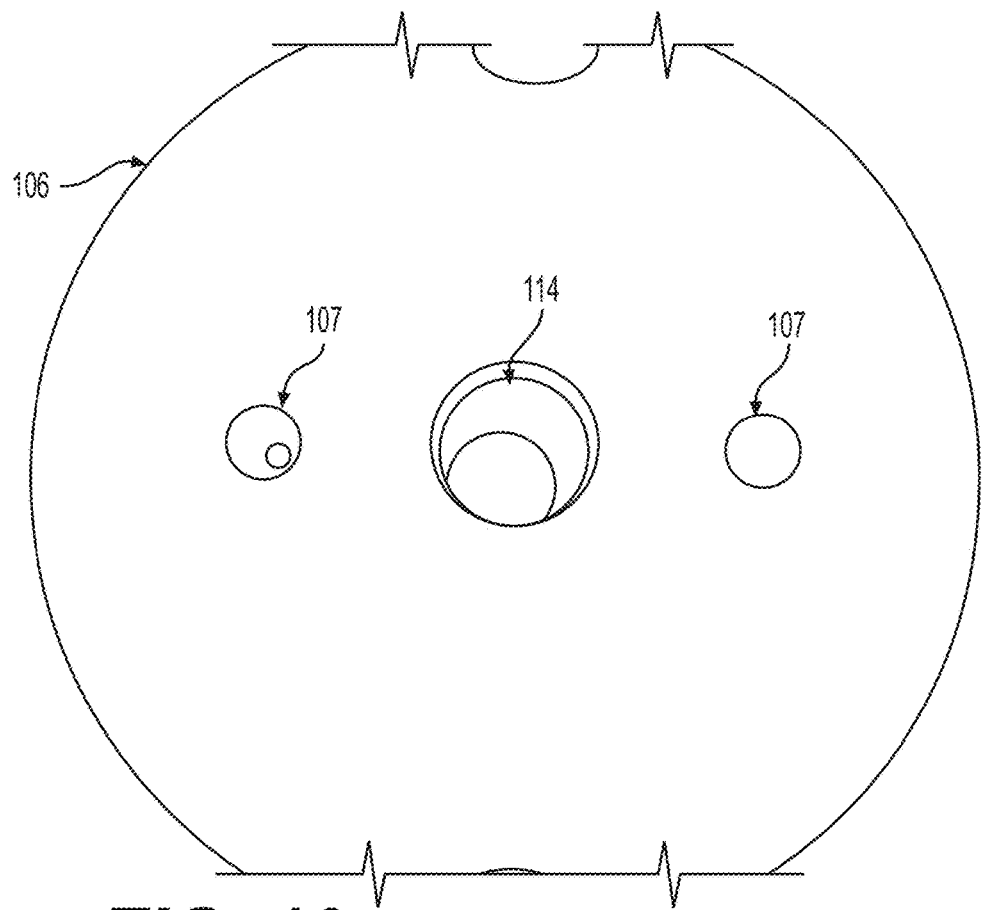
FIG. 10 is a bottom plan view of the compressible member of the one-piece device for preventing access to a conduit of FIG. 5.
Figure 11:
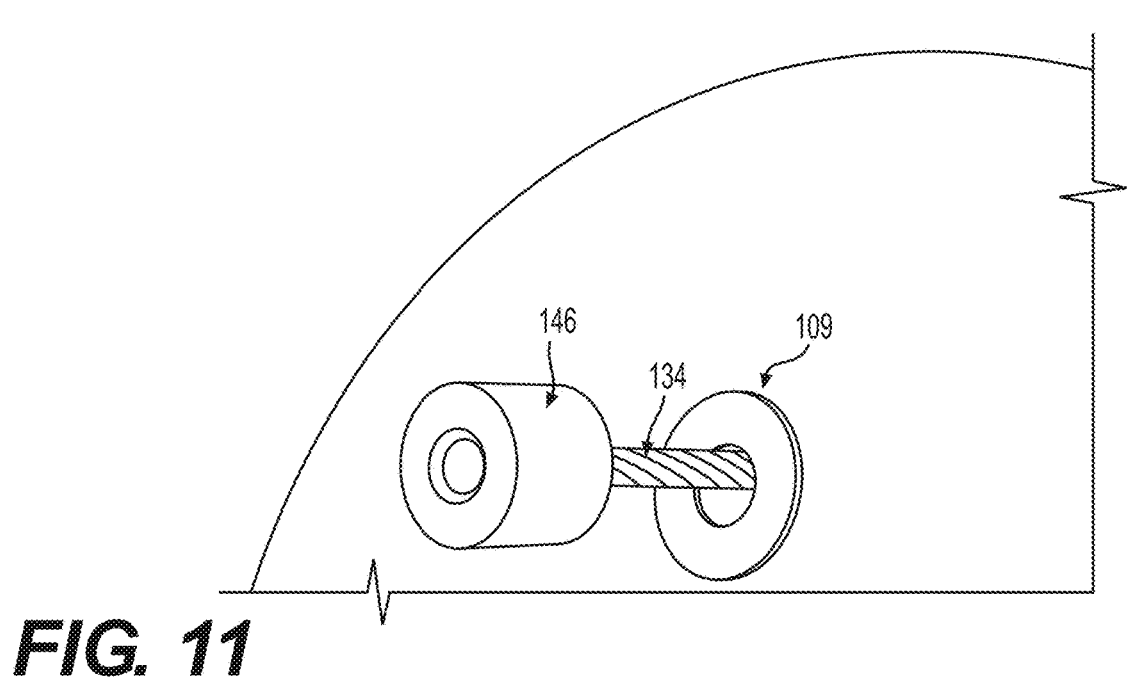
FIG. 11 is a detailed view of the compressible member of FIG. 10 further showing a retaining member and the end of a wire.
Figure 12:
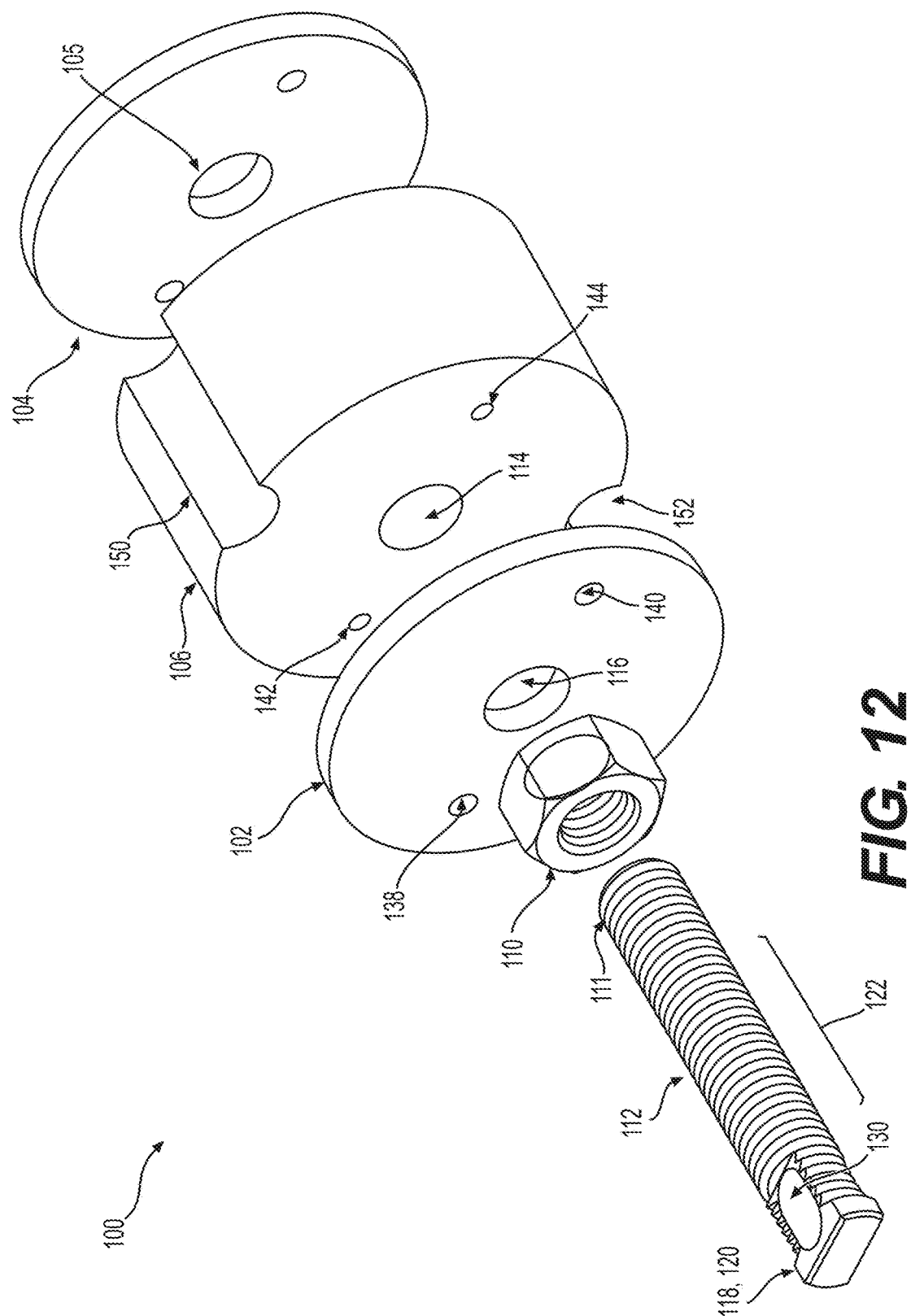
FIG. 12 is an exploded view of the device for preventing access to a conduit of FIG. 5.

FIG. 5 is a plan elevation view of a one-piece device for preventing access to a conduit according to an embodiment. FIG. 6a is a detailed view of the one-piece device for preventing access to a conduit of FIG. 5 showing the nut in a lowered position. FIG. 6b is an enlarged view of a portion of FIG. 6a. FIG. 7 is a detailed view of the one-piece device for preventing access to a conduit of FIG. 5 showing the nut in a raised position. FIG. 8 is a detailed view of the one-piece device for preventing access to a conduit of FIG. 5 showing a compressible member in a raised position. FIG. 9 is a detailed view of the one-piece device for preventing access to a conduit of FIG. 5, the device for preventing access to a conduit being held by a wire loop. FIG. 10 is a bottom plan view of the compressible member of the one-piece device for preventing access to a conduit of FIG. 5. FIG. 11 is a detailed view of the compressible member of FIG. 10 further showing a retaining member and the end of a wire. FIG. 12 is an exploded view of the device for preventing access to a conduit of FIG. 5.

Referring at once to FIGS. 5 to 12, a device 100 for preventing access to a conduit comprises a top compression plate 102, a bottom compression plate 104, a compressible member 106 between the top compression plate 102 and the bottom compression plate 104, a bolt 108 and a nut 110. The bolt 108 has a first end 111 end mounted to the bottom compression 104 plate and a shaft 112 passing through an opening 114 of the compressible member 106 and through an opening 116 of the top compression plate 102. The bolt 108 has a second end 118 opposite from the first end 111 and a head 120 proximate to the second end 118. A least a portion 122 of the shaft 112 proximate to the second end 118 is a threaded shaft 112. The compression plates 102, 104 are made of a solid material, for example steel, stainless steel, carbon fiber, and like materials capable of withstanding a compression force applied to the compressible member 106. The compressible member 106 is made of a polymer, an elastomer, and like materials that can expand in width to meet the inner periphery of a conduit when compressed. The compressible member 106 may for example be fabricated by a molding process. The compressible member 106 is adapted to expand laterally in a direction perpendicular to an axis of the bolt 108 when pressure is applied thereon by the compression plates 102, 104.

The first end 111 of the bolt 108 may be fixedly attached to the bottom compression plate 104, for example by welding the first end 111 of the bolt 108 to the bottom compression plate 104. Alternatively, the bolt 108 may be mounted to the bottom compression plate 104 so that the bolt 108 is retained on the bottom compression plate 104 when the device 100 is assembled. For example, in a variant, the bottom compression plate 104 may comprise an opening 105 and the first end 111 of the bolt 108, which in this case is threaded, may pass through the opening 105 of the bottom compression plate 104. An additional nut (not shown) may then be mounted to the first end 111 of the bolt 108 below the bottom compression plate 104. In another variant, the first end 111 of the bolt 108 may be T-shaped, the first end 111 being wider in breadth than the opening 105 of the bottom compression plate 104, the T-shaped first end 111 of the bolt 108 being placed underneath the bottom compression plate 104 when the device 100 is assembled.

Figure 1:
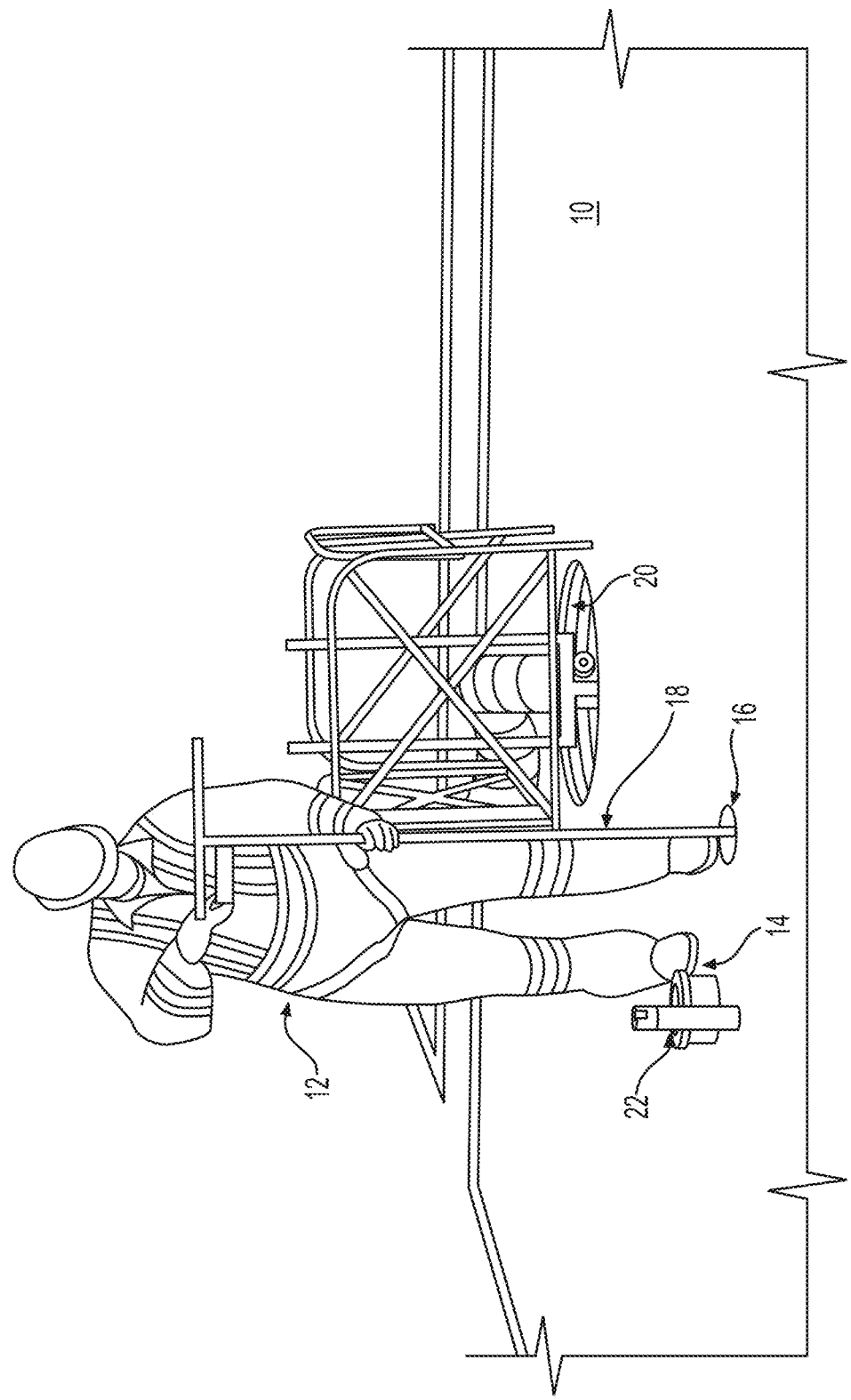
FIG. 1 (Prior Art) shows a worker manipulating an underground water valve before accessing a manhole.
Figure 2A:
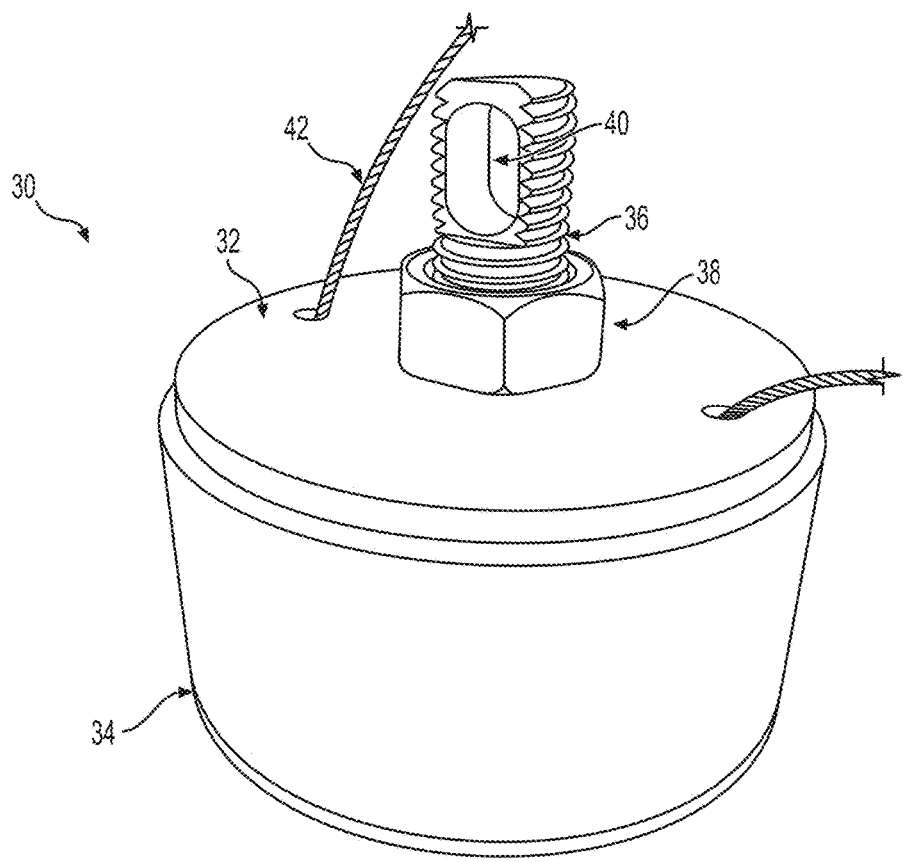
FIG. 2a (Prior Art) is a perspective view of a conventional conduit blocking device.
Figure 2B:
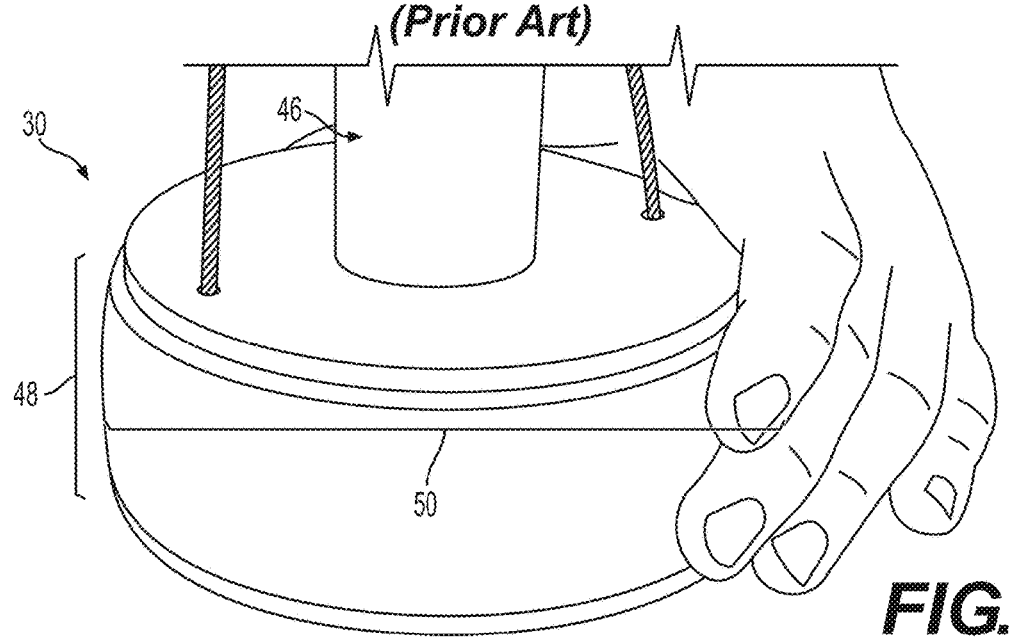
Figure 4:
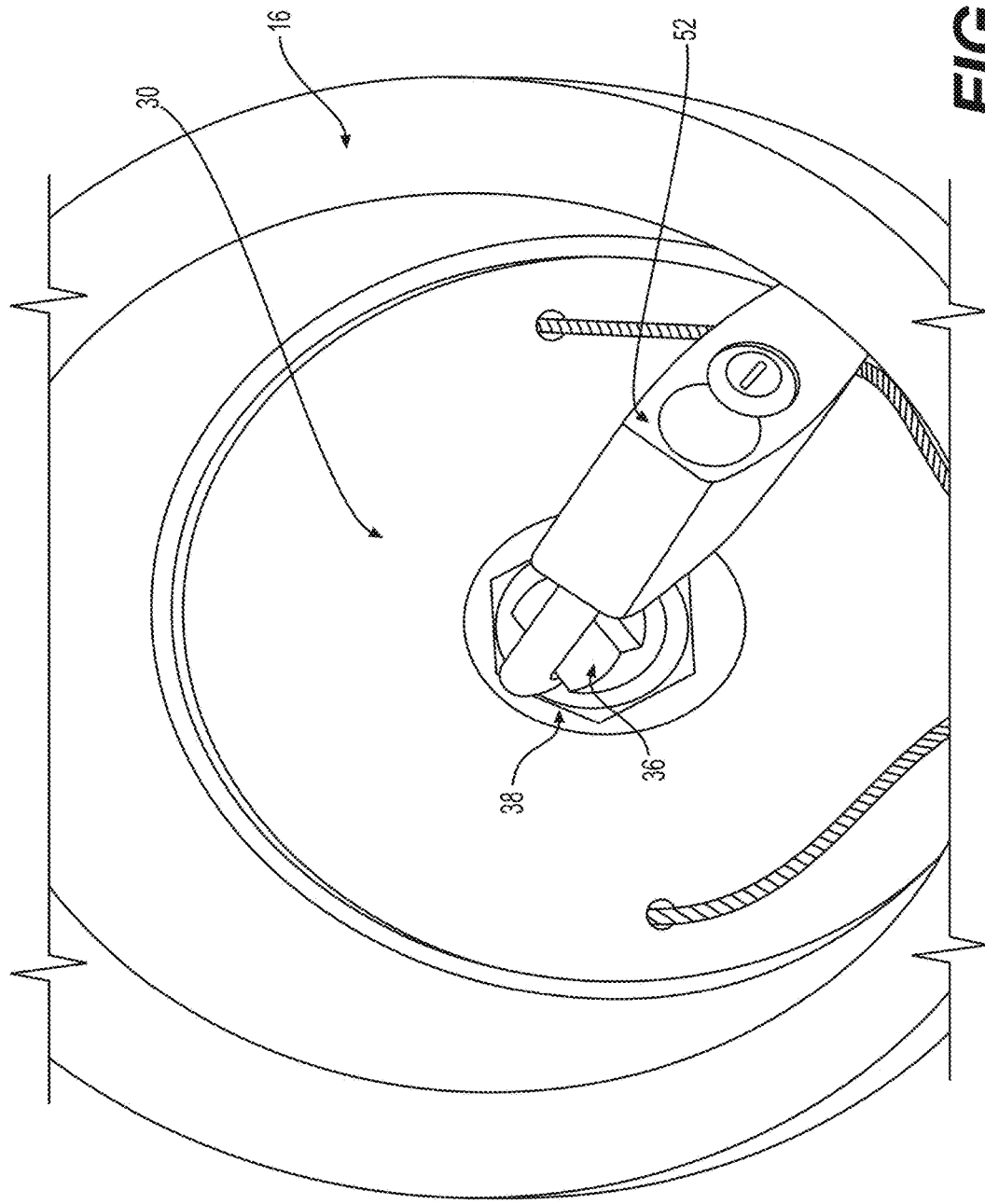

As shown more particularly on FIG. 6b, the head 120 of the bolt 108 has a breadth 124 that extends beyond a major diameter 126 of the threaded shaft 112. In the context of the present disclosure, the major diameter 126 of the threaded shaft 112 is defined as a maximum diameter defined by threads 128 of the threaded shaft 112. In at least one embodiment, the breadth 124 of the head 120 is sized to not exceed a width of the nut 110 in order to allow a tool (for instance the tool 46 shown on FIG. 2b) to pass over the head 120 and to reach the nut 110.

The nut 110 is mounted on the threaded shaft 112 between the head 120 and the top compression plate 102.

In an embodiment, an aperture 130 is made in the threaded shaft 112, at a location proximate to the second end 118 of the bolt 108. The aperture 130 is sized for mounting a padlock thereon, such as for example the above mentioned padlock 52. In the various drawings, the aperture 130 is shown underneath the head 120. However, it is contemplated that the second end 118 of the bolt 108 could extend beyond the head 120, the aperture 130 being formed in the bolt 108, closer to the second end 118 of the bolt 108 and above the location of the head 120.

A wire 132 can be used to manually hold the device 100. The wire 132 forms a loop above the head 120 of the bolt 108. Two (2) ends 134, 136 of the wire 132 pass through corresponding openings 138, 140 of the top plate and through corresponding openings 142, 144 of the compressible member 106. The two (2) ends 134, 136 of the wire 132 are attached to a pair of corresponding retention members, for example clips 146, 148, which in the non-limitative example as shown on FIG. 5 are positioned below the compressible member 106. In a particular embodiment as illustrated on FIGS. 10 and 11, two (2) small chambers 107 are formed in the bottom face of the compressible member 106, at places where ends 134, 136 of the wire 132 are located when the device 100 is assembled. The chambers 107 are sized to receive the clips 146, 148. Small rings 109 may be mounted on the ends 134, 136 of the wire 132 and inserted in the chambers 107 to prevent migration of the clips 146, 148 into the compressible member 106 when a tension is applied on the wire 132.

As illustrated, the top compression plate 102 and the bottom compression plate 104 are generally circular plates. Likewise, the compressible member 106 is shown having a generally circular periphery. Moreover, in the device 100 as illustrated, the compression plates 102, 104 and the compressible member 106 share a common axis with the bolt 108. Other shapes of the compression plates 102, 104 and of the compressible member 106 can be contemplated. In a non-limiting example, the device 100 and its components can be adapted in shape for use in a conduit that does not have a circular internal cross section. Further, in a variant, the compression plates 102, 104 could be substantially circular while the compressible member 106 could be generally circular with one or more truncated edges (not shown). Other shapes and configurations of the compression plates 102, 104 and of the compressible member 106 will come to the mind of the skilled reader having the benefit of the present disclosure and are therefore within the scope of present disclosure.

Fluid passages 150, 152 are formed on the periphery of the compressible member 106 and extend between the top compression plate 102 and the bottom compression plate 104. Though the fluid passages 150, 152 are shown have extend in parallel to the axis of the bolt 108, they could be at an angle, as long as they extend from the top compression plate 102 to the bottom compression plate 104. The semi-circular cross-section of the fluid passages 150, 152 as illustrated is for illustration purposes, as the fluid passages 150, 152 may have many other shapes. (Though two (2) fluid passages 150, 152 are illustrated on the various drawings, use of one (1) fluid passage or of a larger number of fluid passages is also contemplated. In at least one variant where the compressible member 106 is generally circular with one or more truncated edges, these truncations of the edges of the compressible member 106 may act as fluid passages. In a non-limiting example that may be observed by considering FIG. 7, in one embodiment, a periphery of the compressible member 106 extends beyond peripheries of the top plate 102 and of the bottom plate 104 so that a fluid, for example water, can pass around the top compression plate 102, reach one of the fluid passages 150, 152 and pass around the bottom compression plate 104. It may be further observed that, in a variant, the general diameter of the compressible member 106 could be substantially equal to that of the compression plates 102, 104 when not in use. In such a case, rotating the nut 110 to compress the compressible member 106 would cause its periphery to expand beyond the diameter of the compression plates 102, 104, whereby the fluid could still pass around the compression plates 102, 104. It is expected that the skilled reader will be able to properly size the compression plates 102, 104 and the compressible member 106 as a function of the expected flexibility of the material of the compressible member 106 and as a function of the internal diameter or periphery of the conduit in which the device 100 is to be installed.

Figure 13:
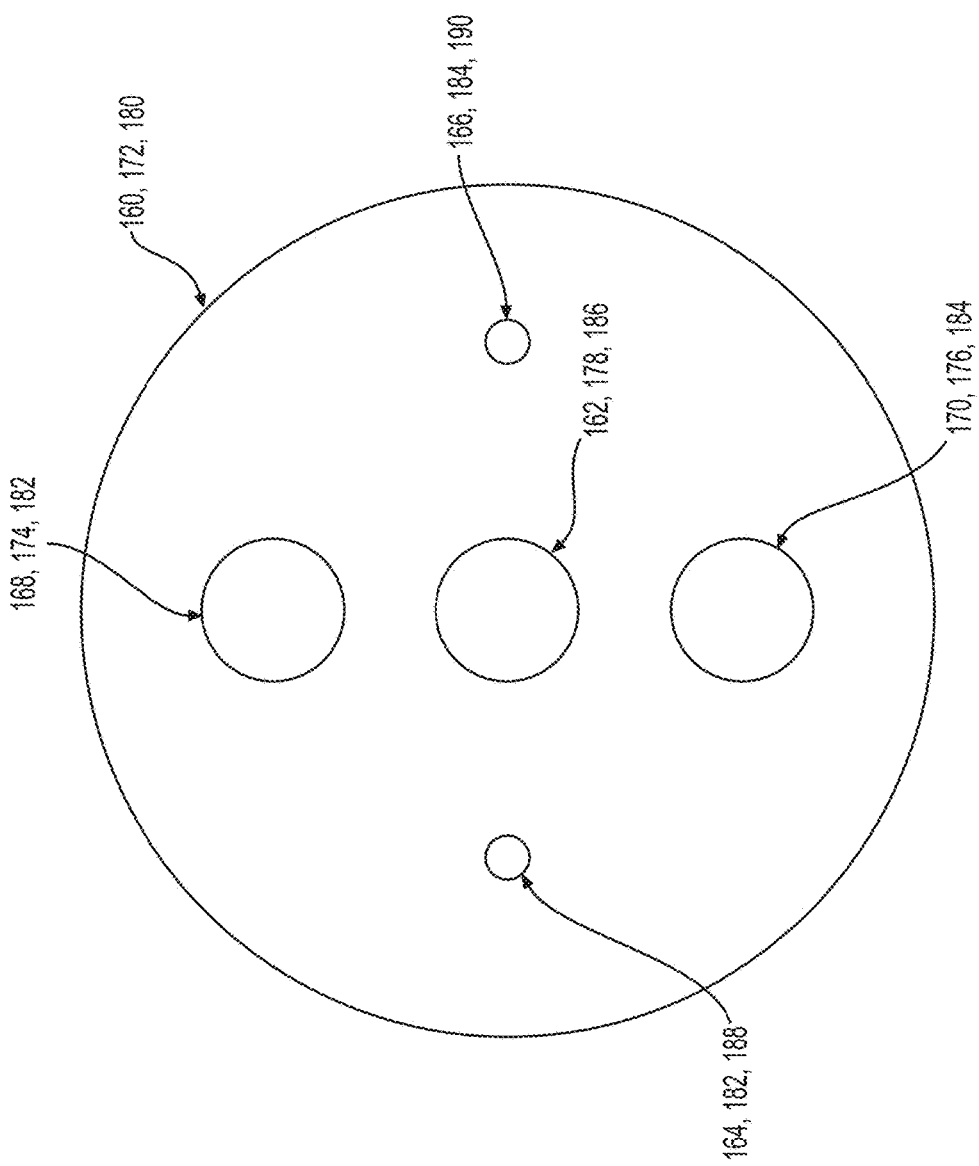
FIG. 13 is top a plan view of components of a device for preventing access to a conduit according to an alternate embodiment.

FIG. 13 is a top plan view of components of a device for preventing access to a conduit according to an alternate embodiment. In a variant of the device 100, a top compression plate 160 replaces the top compression plate 102, a bottom compression plate 172 replaces the bottom compression plate 104 and a compressible member 180 replaces the compressible member 106. In the non-limitative example of FIG. 13, the top compression plate 160, the bottom compression plate 172 and the compressible member 180 all share similar top plan views. The top compression plate 160 includes an opening 162 to allow the passage of the bolt 108, and openings 164, 166 to allow the passage of the wire 132. Channels 168, 170 allow passage of a fluid therethrough. The bottom compression plate 172 may be substantially identical to the top compression plate 160 and include channels 174, 176. The bottom compression plate 172 may optionally include an opening 178 for insertion of the first end 111 of the bolt 108, for example to facilitate welding of the bolt 108 to the bottom compression plate 172. The bottom compression plate 172 also has openings 182, 184 to pass the ends 134, 136 of the wire 132 therethrough. The bottom compression plate 172 may be made identical to the top compression plate 160 as this will reduce the number of distinct components of the device 100.

In the variant of the device 100 illustrated on FIG. 13, the compressible member 180 is similar to the compressible member 106 except that fluid passages 182, 184 are located within the periphery of the compressible member 180. The compressible member 106 has an opening 186 adapted for insertion of the bolt 108 and openings 188, 190 for insertion of the wire 132. The passage of the wire 132 though the openings 164, 166 of the top compression plate 160, through corresponding openings 188, 190 of the compressible member 180 and through openings 182, 184 of the bottom compression plate provides for an alignment of the channels 168, 170 with fluid passages 182, 184 of the compressible members and with channels 174, 176 of the bottom compression plate. While FIG. 13 illustrates pairs of channels in the top and bottom compression plates 160, 172 and a pair of corresponding pair fluid passages in the compressible member 180, use of a single fluid passage with a corresponding channel on each of the top and bottom compression plates and use of multiple fluid passages with matching channels are also contemplated. A variant of the compressible member having at once fluid passages on its outer periphery and within its periphery is also contemplated.

In operation, a worker may hold the device 100 by hand via its wire 132 and insert the device in an accessible part of a conduit. While holding the device, the worker uses a tool, for example a power tool, to rotate the nut 110, causing the top and bottom plates 102, 104 to apply pressure on the compressible member 106. The compressible member 106 expands in width as a result of this pressure, until it fits with the internal periphery of the conduit, preventing further movement of the device 100. Having verified the solidity of the installation of the device 100 within the conduit, the worker may install a padlock on the aperture 130 of the bolt 108 to prevent accidental or malicious access to the conduit beyond the device 100. The worker may install a cap on the conduit, above the device 100. If water reaches the device 100, it will pass around the device 100, or through the device 100, depending on the positioning of the fluid passages. When the time comes to remove the device 100, the worker removes the padlock and, while holding the wire 132, unscrews the nut 110 to release the pressure on the compressible member. Because the head 120 of the bolt 108 is broader than the major diameter 126 of the threaded shaft 112 of the bolt, the worker is prevented from accidentally removing the nut 110 completely from the device 100, thereby preventing the bottom compression plate 104 or other component from falling down the conduit. This construction of the device 100 ensures that the device 100 will remain unitary under any but the most abusive conditions.

Although the above description of an embodiment of the device 100 for preventing access to a conduit relates to its use in preventing access to an underground water valve at the bottom of the conduit, the present disclosure is not limited to this use. The device 100 for preventing access to a conduit can be installed in conduits that lead to other types of valves or to other devices besides a valve, or to any other conduit, for example a gas conduit. In particular the device 100 for preventing access to a conduit may be installed in a conduit of any type, whether the conduit is installed in the ground or not, in horizontal, vertical or angled positions, for preventing access to other types of valves or any other device that may lie within the conduit, beyond the device 100 for preventing access to a conduit.

Those of ordinary skill in the art will realize that the description of the device for preventing access to a conduit, useable for preventing accidental or malicious operation of an underground water valve, are illustrative only and are not intended to be in any way limiting. Other embodiments will readily suggest themselves to such persons with ordinary skill in the art having the benefit of the present disclosure. Furthermore, the disclosed device for preventing access to a conduit may be customized to offer valuable solutions to existing needs and problems related to safety concerns of workers accessing underground conduits. In the interest of clarity, not all of the routine features of the implementations of the device for preventing access to a conduit are shown and described. In particular, combinations of features are not limited to those presented in the foregoing description as combinations of elements listed in the appended claims form an integral part of the present disclosure. It will, of course, be appreciated that in the development of any such actual implementation of the device for preventing access to a conduit, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of safety devices having the benefit of the present disclosure.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A device for preventing access to a conduit, comprising:
   a top compression plate;
   a bottom compression plate;
   a compressible member between the top and bottom compression plates;
   a bolt having a first end mounted to the bottom compression plate and a shaft passing through a central opening of the compressible member and through openings of the top compression plate, the bolt having a second end opposite from the first end and a head proximate to the second end, at least a portion of the shaft proximate to the second end being a threaded shaft, the head of the bolt extending beyond a major diameter of the threaded shaft; and
   a nut mounted on the threaded shaft between the head and the top compression plate;
   wherein the compressible member comprises a fluid passage formed on an outer periphery of the compressible member and extending between the top and bottom compression plates, the top and bottom compression plates being sized and configured to allow passage of a fluid via the fluid passage between the top and bottom compression plates.

2. The device of claim 1, wherein the shaft further comprises an aperture proximate to the second end of the bolt.

3. The device of claim 1, wherein the top and bottom compression plates are generally circular plates and wherein the compressible member has a generally circular cross section.

4. The device of claim 3, wherein the top and bottom compression plates and the compressible member share a common axis with the bolt.

5. The device of claim 1, further comprising a wire forming a loop above the head of the bolt, two ends of the wire passing through secondary openings of the top compression plate and being attached to two corresponding retention members positioned below the top compression plate.

6. The device of claim 5, wherein both ends of the wire pass through secondary openings of the compressible member and wherein the two corresponding retention members are positioned in chambers formed in the compressible member.

7. The device of claim 1, wherein each of the top and bottom compression plates includes a channel configured to allow passage of a fluid via the fluid passage.

8. The device of claim 1, wherein an outer periphery of the compressible member extends beyond outer peripheries of the top and bottom compression plates.

9. The device of claim 1, wherein the first end of the bolt is fixedly attached to the bottom compression plate.

10. Use of the device of claim 1 installed within a conduit for preventing operation of a valve located in the conduit.

11. A device for preventing access to a conduit, comprising:
 a top compression plate;
 a bottom compression plate;
 a compressible member between the top and bottom compression plates, the compressible member comprising on its outer periphery a fluid passage extending between the top and bottom compression plates;
 a bolt having a first end mounted to the bottom compression plate and a shaft passing through a central opening of the compressible member and through openings of the top compression plate, the bolt having a second end opposite from the first end, at least a portion of the shaft proximate to the second end being a threaded shaft; and
 a nut mounted on the threaded shaft between the head and the top compression plate;
 wherein the top and bottom compression plates are sized and configured to allow passage of a fluid via the fluid passage between the top and bottom compression plates.

12. The device of claim 11, wherein the first end of the bolt is welded to the bottom compression plate.

13. The device of claim 11, wherein the shaft further comprises an aperture proximate to the second end of the bolt.

14. The device of claim 11, wherein:
 the bottom compression plate comprises an opening;
 the first end of the bolt passes through the opening of the bottom compression plate; and
 the device further comprises a second nut mounted to the first end of the bolt below the bottom compression plate.

15. The device of claim 11, wherein the first end of the bolt is T-shaped, the first end of the bolt being placed underneath the bottom compression plate.

16. The device of claim 11, wherein the compressible member comprises a plurality of fluid passages distributed around the periphery of the compressible member.

17. The device of claim 11, wherein the bolt has a head proximate to second end, the head of the bolt extending beyond a major diameter of the threaded shaft.

18. Use of the device of claim 11 installed within a conduit for preventing operation of a valve located in the conduit.

19. The device of claim 1, wherein the compressible member is a unitary compressible member.

20. The device of claim 11, wherein the compressible member is a unitary compressible member.

* * * * *